US011890586B2

(12) United States Patent
Mizukami et al.

(10) Patent No.: US 11,890,586 B2
(45) Date of Patent: Feb. 6, 2024

(54) FINE BUBBLE GENERATION DEVICE AND METHOD FOR GENERATING FINE BUBBLES

(71) Applicants: CATALER CORPORATION, Kakegawa (JP); NATIONAL UNIVERSITY CORPORATION SHIZUOKA UNIVERSITY, Shizuoka (JP)

(72) Inventors: Tomohito Mizukami, Kakegawa (JP); Yusuke Saito, Kakegawa (JP); Nobuyuki Mase, Hamamatsu (JP)

(73) Assignees: CATALER CORPORATION, Kakegawa (JP); NATIONAL UNIVERSITY CORPORATION SHIZUOKA UNIVERSITY, Shizuoka (JP)

( * ) Notice: Subject to any disclaimer, the term of this patent is extended or adjusted under 35 U.S.C. 154(b) by 243 days.

(21) Appl. No.: 17/272,549

(22) PCT Filed: Sep. 9, 2019

(86) PCT No.: PCT/JP2019/035418
§ 371 (c)(1),
(2) Date: Mar. 1, 2021

(87) PCT Pub. No.: WO2020/054680
PCT Pub. Date: Mar. 19, 2020

(65) Prior Publication Data
US 2021/0322937 A1 Oct. 21, 2021

(30) Foreign Application Priority Data
Sep. 11, 2018 (JP) ................................ 2018-169968

(51) Int. Cl.
B01F 25/452 (2022.01)
B01F 23/232 (2022.01)

(52) U.S. Cl.
CPC ...... *B01F 25/45221* (2022.01); *B01F 23/232* (2022.01); *B01F 2215/0431* (2013.01)

(58) Field of Classification Search
CPC ............ B01F 2215/0431; B01F 23/232; B01F 25/45221; B01F 23/2373; B01F 23/2375
See application file for complete search history.

(56) References Cited

U.S. PATENT DOCUMENTS 6,290,847 B1 * 9/2001 Cutler .................. B01D 61/145
210/317
7,255,332 B2 * 8/2007 Osborn ............. B01F 25/31331
261/115
(Continued)

FOREIGN PATENT DOCUMENTS

CN 104204433 A 12/2014
CN 105840273 A 8/2016
(Continued)

OTHER PUBLICATIONS

English translation of JP2002301345A (Sasaki) obtained from <worldwide.espacenet.com> on Feb. 15, 2023. (Year: 2023).*
(Continued)

*Primary Examiner* — Marc C Howell
*Assistant Examiner* — Patrick M McCarty
(74) *Attorney, Agent, or Firm* — Oliff PLC

(57) ABSTRACT

A device produces fine bubbles that has a simple configuration and that is capable of generating fine bubbles. This fine bubble generation device includes: a porous body having continuous pores; a liquid supply section that supplies a liquid to the porous body and causes the liquid to circulate through the continuous pores; and a liquid dis-
(Continued)

charge section for discharging liquid that has circulated through the continuous pores.

8 Claims, 2 Drawing Sheets

(56) References Cited

U.S. PATENT DOCUMENTS

| | | | |
|---|---|---|---|
| 8,821,609 | B2 | 9/2014 | Okazaki et al. |
| 9,764,254 | B2* | 9/2017 | Kobayashi ............... B01F 23/29 |
| 2004/0170803 | A1* | 9/2004 | Ichikawa ............. B01D 46/249 |
| | | | 428/116 |
| 2009/0038701 | A1 | 2/2009 | Delmotte |
| 2011/0165040 | A1 | 7/2011 | Huang et al. |
| 2012/0186206 | A1 | 7/2012 | Tanaka et al. |
| 2013/0065973 | A1 | 3/2013 | Hirschberg et al. |
| 2015/0059321 | A1 | 3/2015 | Nakayama et al. |
| 2017/0259218 | A1 | 9/2017 | Lin et al. |
| 2021/0146318 | A1* | 5/2021 | Horiuchi ........... B01F 23/23413 |

FOREIGN PATENT DOCUMENTS

| | | |
|---|---|---|
| DE | 10 2006 048456 A1 | 4/2008 |
| EP | 2 368 625 A1 | 9/2011 |
| JP | 2002-018467 A | 1/2002 |
| JP | 2002-301345 A | 10/2002 |
| JP | 2006289183 A * | 10/2006 |
| JP | 2006314972 A * | 11/2006 |
| JP | 2007-237161 A | 9/2007 |
| JP | 2010-269200 A | 12/2010 |
| JP | 2017-217585 A | 12/2017 |

OTHER PUBLICATIONS

J.A. Fernando, D.D.L. Chung (2002), Pore Structure and Permeability of Alumina Fiber Filter Membrane for Hot Gas Filtration. Journal of Porous Materials. 9, 211-219. (Year: 2002).*

R.A. Terpstra, J.W. Elferink (1991), Controlling the pore size of ceramic microfiltration membranes by varying the degree of flocculation of the coating suspension. Journal of Material Science Letters. 10, 1384-1385. (Year: 1991).*

Espinal, L. (2012). Porosity and Its Measurement. In Characterization of Materials, E.N. Kaufmann (Ed.). https://doi.org/10.1002/0471266965.com129 (Year: 2012).*

Reif, Konrad, "BOSCH Diesel Engine Management: System and Components", Beijing Institute of Technology Press, Jun. 2018, pp. 177-178.

Nov. 19, 2019 Search Report issued in International Patent Application No. PCT/JP2019/035418.

Nov. 19, 2019 Written Opinion issued in International Patent Application No. PCT/JP2019/035418.

* cited by examiner

FINE BUBBLE GENERATION DEVICE AND METHOD FOR GENERATING FINE BUBBLES

FIELD

The present invention relates to a fine bubble generation device and a fine bubble generation method.

BACKGROUND

The phrase "fine bubbles" refers to bubbles having a diameter of 100 μm or less, and the term "ultrafine bubbles" refers to bubbles having a diameter of 1 μm or less, among fine bubbles. Since these have properties different from those of ordinary bubbles, the applications thereof have been studied in various fields in recent years.

Examples of methods for producing fine bubbles or ultrafine bubbles include a swirling liquid flow method, a pressure dissolution/decompression method, and a micropore method.

In the swirling liquid flow method, a liquid is injected into a cylindrical container at a high speed to form a high-speed swirling flow in the interior thereof, and a pressure drop is generated in the center thereof. Fine bubbles are obtained when gas is introduced from small holes in the lower part of the cylindrical container and the gas is discharged from small holes in the upper part thereof.

In the pressure dissolution/decompression method, gas is pressurized and dissolved in a fluid. The fluid is then rapidly discharged into a liquid under reduced pressure or atmospheric pressure, so that the dissolved gas can precipitate as fine bubbles.

In the micropore method, gas is discharged into a liquid from nano-level micropores.

Further, other methods have been studied. For example, in Patent Literature 1, gas is pressurized with a pump to dissolve the gas in a liquid, and the gas-liquid mixture is flowed through a metal filter having a microporous channel, whereby refined bubbles are obtained. The microporous channel has a length of 30 mm to 60 mm and a pore diameter of 300 μm or less, and is a regular linear channel. Furthermore, in the invention described in Patent Literature 1, when the gas-liquid mixture flows through the microporous channel, the bubbles are shear-broken and fine-textured fine bubbles are obtained.

CITATION LIST

Patent Literature

[PTL 1] Japanese Unexamined Patent Publication (Kokai) No. 2017-217585

SUMMARY

Technical Problem

The object of the present invention is to provide a fine bubble generation device and a fine bubble generation method capable of generating fine bubbles with a simple structure.

Solution to Problem

The present inventors have discovered that the above problems can be solved by the present invention having the following Aspects.

<<Aspect 1>>
A fine bubble generation device, comprising a porous body having continuous pores, a liquid supply part which supplies a liquid to the porous body and causes the liquid to flow through the continuous pores, and a liquid discharge part which discharges the liquid caused to flow through the continuous pores.
<<Aspect 2>>
The fine bubble generation device according to Aspect 1, wherein the porous body is made of ceramic.
<<Aspect 3>>
The fine bubble generation device according to Aspect 1 or 2, wherein the average flow diameter of the porous body as measured with a palm porometer is 5 μm to 100 μm.
<<Aspect 4>>
The fine bubble generation device according to any one of Aspects 1 to 3, wherein the porosity of the porous body is 40% to 80%.
<<Aspect 5>>
The fine bubble generation device according to any one of Aspects 1 to 4, wherein the porous body has a plurality of inlet flow paths and a plurality of outlet flow paths, and is a porous filter substrate in which the inlet flow paths and the outlet flow paths are separated by porous walls.
<<Aspect 6>>
The fine bubble generation device according to Aspect 5, wherein the plurality of inlet flow paths and the plurality of outlet flow paths of the porous filter substrate extend substantially in parallel and are adjacent to each other.
<<Aspect 7>>
The fine bubble generation device according to Aspect 5 or 6, wherein the thickness of the porous walls is 1.0 mm or less.
<<Aspect 8>>
A fine bubble generation method comprising the steps of:
supplying a liquid to the porous body from the liquid supply part of the fine bubble generation device according to any one of Aspects 1 to 7, and
causing the supplied liquid to flow through the continuous pores of the porous body to obtain a liquid containing fine bubbles from the liquid discharge part.

Advantageous Effects of Invention

According to the present invention, there can be provided a fine bubble generation device and a fine bubble generation method capable of generating fine bubbles with a simple structure. In particular, according to the present invention, it is possible to generate fine bubbles even without pressurization by a pump. Thus, the fine bubble generation device of the present invention can be miniaturized and can be used even in the home. Further, the fine bubble generation device of the present invention can operate at very low energy, and can be used without generating noise. Likewise, the fine bubble generation method of the present invention is also advantageous in that it can be carried out in the home and can be carried out at low operating energy.

DESCRIPTION OF EMBODIMENTS

<<Fine Bubble Generation Device>>

The fine bubble generation device of the present invention comprises a porous body having continuous pores, a liquid supply part which supplies a liquid to the porous body and causes the liquid to flow through the continuous pores, and a liquid discharge part which discharges the liquid caused to flow through the continuous pores.

Figure 1:
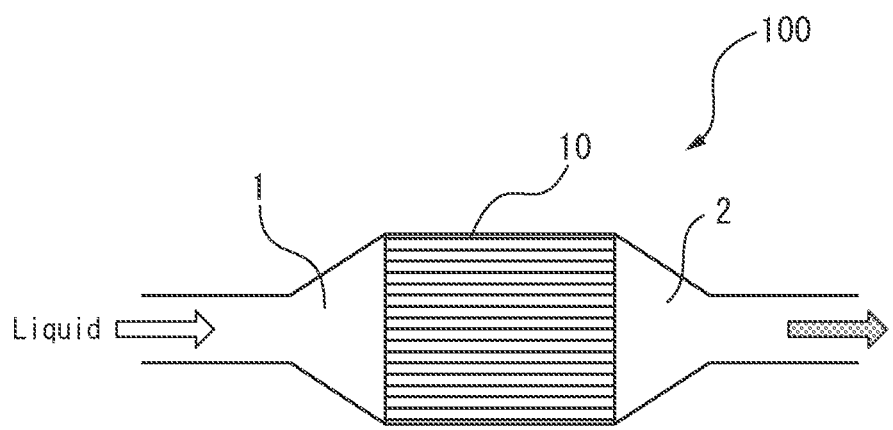
FIG. 1 is a schematic view of an embodiment of the device of the present invention.

For example, as shown in FIG. 1, in the fine bubble generation device (100) of the present invention, the liquid is supplied from the liquid supply part (1) to the porous body (10), the liquid flows through the continuous pores of the porous body (10), and the liquid containing the fine bubbles obtained from the porous body (10) is discharged from the liquid discharge part (2).

The present inventors have discovered that when a liquid is flowed through a porous body such as a diesel particulate filter (DPF), fine bubbles are generated in the liquid. It is believed that this is because when a liquid flows through a porous body such as a porous filter substrate, a pressure decrease occurs due to the Venturi effect, whereby gas dissolved in the liquid comes out as fine bubbles. Specifically, when the liquid penetrates into the pores of the porous body from the normal flow path, because the sum of the dynamic pressure and static pressure is maintained due to Bernoulli's theorem, the dynamic pressure becomes very high and the static pressure becomes very low. By reducing the static pressure, the gas dissolved in the liquid comes out as fine bubbles. Since the fine bubbles are unlikely to disappear once formed, it is considered that the fine bubbles remain even if the liquid containing the fine bubbles returns to the normal flow path.

Note that if the pore diameter of the porous body is small to some extent, it is sufficient for the generation of fine bubbles, but if the pore diameter is very small, it is unclear whether a large quantity of fine bubbles is generated accordingly. It is also conceivable that, when the pore diameter has a certain size, the space region in which the fine bubbles are generated becomes wider, and the total number of fine bubbles generated increases.

According to the fine bubble generation device of the present invention, it is possible to generate fine bubbles even without pressurization by a pump. Thus, the fine bubble generation device of the present invention can be miniaturized and can be used even in the home. Further, the fine bubble generation device of the present invention can operate at very low energy, and can be used without generating noise.

The liquid used in the fine bubble generation device of the present invention is not particularly limited as long as it is a liquid in which a gas is dissolved. According to the fine bubble generation device of the present invention, it is possible to generate fine bubbles of various types of gases from various liquids. The liquid used may be a liquid in which a gas is dissolved by a means such as pressurization in advance. Specific examples of the liquid used in the fine bubble generation device of the present invention include aqueous liquids (e.g., tap water, pure water, and deionized water); aqueous solutions containing a surfactant; and hydrophilic liquids such as methanol and ethanol, and may be an organic solvent. The type of gas is not particularly limited as long as it can be dissolved in the liquid used, and examples thereof include oxygen and hydrogen.

Fine bubbles of various diameters can be generated by changing the pore diameter of the porous body. The average particle diameter of the fine bubbles may be, for example, 100 μm or less, 50 μm or less, 30 μm or less, 10 μm or less, 5 μm or less, 3 μm or less, 1 μm or less, 500 nm or less, 300 nm or less, or 100 nm or less, and may be 10 nm or more, 50 nm or more, 100 nm or more, 300 nm or more, or 500 nm or more. Thus, the fine bubbles obtained in the fine bubble generation device of the present invention may be ultrafine bubbles having an average particle diameter of 1 μm or less. The average particle diameter of the ultrafine bubbles can be measured using the NanoSight nanoparticle analysis system (Malvern Panalytical) and the average particle diameter of fine bubbles can be measured using a Microtrac PartAn SI (MicrotracBEL Corporation).

The fine bubbles obtained with the fine bubble generation device of the present invention can be used in various applications, and can be used, for example, in applications such as cleaning, chemical synthesis, sterilization and disinfection, deodorization, and fine particle adsorption.

<Porous Body>

The porous body used in the present invention is not particularly limited as long as it has continuous pores and a liquid can flow through the continuous pores. By flowing the liquid through the continuous pores, the flow rate of the liquid is locally increased. Specifically, in the liquid in this case, it is believed that the static pressure becomes low as the dynamic pressure increases locally, whereby fine bubbles are generated. The continuous pores may be irregularly shaped.

The material of the porous body is not particularly limited, and may be, for example, a porous metal, a porous ceramic, or a porous resin. Among these, a porous body made of ceramic can be preferably used from the viewpoint of easily obtaining a porous body having preferable continuous pores, and in particular, a porous body having irregularly-shaped continuous pores. Examples of ceramics include, among others, cordierite ($2MgO \cdot 2Al_2O_3 \cdot 5SiO_2$), alumina, silica, zirconia, and silicon carbide.

The pore diameter of the porous body is not particularly limited as long as fine bubbles can be generated thereby, and for example, the average pore diameter as measured with a mercury porosimeter may be 5 μm or more, 8 μm or more, 10 μm or more, or 15 μm or more, and may be 500 μm or less, 300 μm or less, 100 μm or less, 50 μm or less, 30 μm or less, 20 μm or less, or 15 μm or less.

Furthermore, the present inventors have discovered that the average flow diameter as measured with a palm porometer is highly correlated with the number of fine bubbles generated. This average flow diameter corresponds to the average of the pore diameters of the smallest part of the continuous pores present in the porous body, and it is considered that the pore diameter of the smallest part greatly affects the generation of fine bubbles. The average flow diameter measured with a palm porometer may be 3 μm or more, 5 μm or more, 8 μm or more, 10 μm or more, or 15 μm or more, and may be 500 μm or less, 300 μm or less, 200 μm or less, 100 μm or less, 50 μm or less, 30 μm or less, or 20 μm or less.

The porosity of the porous body is not particularly limited as long as fine bubbles can effectively be generated thereby, and the porosity may be, for example, 30% or more, 40% or more, 50% or more, or 60% or more, and may be 90% or less, 80% or less, 70% or less, or 60% or less. The porosity can be determined from the ratio of the weight of the porous body to the theoretical weight in a medium due to the material of the porous body.

The thickness of the porous body through which the liquid flows is not particularly limited as long as fine bubbles can effectively be generated thereby, and the thickness may be, in consideration of fluid pressure loss, 10 mm or less, 5.0 mm or less, 1.0 mm or less, 500 µm or less, 300 µm or less, or 200 µm or less, and may be 100 µm or more, 200 µm or more, or 300 µm or more.

It is preferable that the porous body be a porous substrate having a plurality of flow paths and the flow paths be separated by porous walls. This porous substrate may be a so-called straight flow honeycomb substrate in which the flow paths extend substantially in parallel and are adjacent to each other.

As such a straight flow honeycomb substrate, a honeycomb substrate well known in the field for producing exhaust gas purification catalysts for automobiles can be used as-is.

Furthermore, among such porous substrates, a porous filter substrate in which a plurality of flow paths are constituted by a plurality of inlet flow paths and a plurality of outlet flow paths, and in which substantially all of the liquid flows into the inlet flow paths and flows through the continuous pores in the porous walls, and then flows out of the outlet flow paths is particularly preferable. In this case, a solution can effectively flow through the porous walls at low pressure loss. In particular, the porous filter substrate may be a so-called wall flow honeycomb substrate in which a plurality of inlet flow paths and a plurality of outlet flow paths each extend substantially in parallel and are adjacent to each other.

As such a wall flow honeycomb substrate, a honeycomb substrate well known in the art for producing diesel particulate filters (DPF) or gasoline particulate filters (GPF) can be used as-is.

When the flow paths of the honeycomb substrate are arranged substantially in parallel, the number of flow paths per unit area in a cross-section is referred to as the cell number. The cell number may be, for example, 300 cells/in$^2$ or more, 500 cells/in$^2$ or more, 800 cells/in$^2$ or more, 1000 cells/in$^2$ or more, or 1200 cells/in$^2$ or more, and may be 2000 cells/in$^2$ or less, 1500 cells/in$^2$ or less, 1200 cells/in$^2$ or less, 1000 cells/in$^2$ or less, or 800 cells/in$^2$ or less.

The thickness of the porous walls of the honeycomb substrate may be 1.0 mm or less, 500 µm or less, 300 µm or less, or 200 µm or less, and may be 100 µm or more, 200 µm or more, or 300 µm or more.

Figure 2:
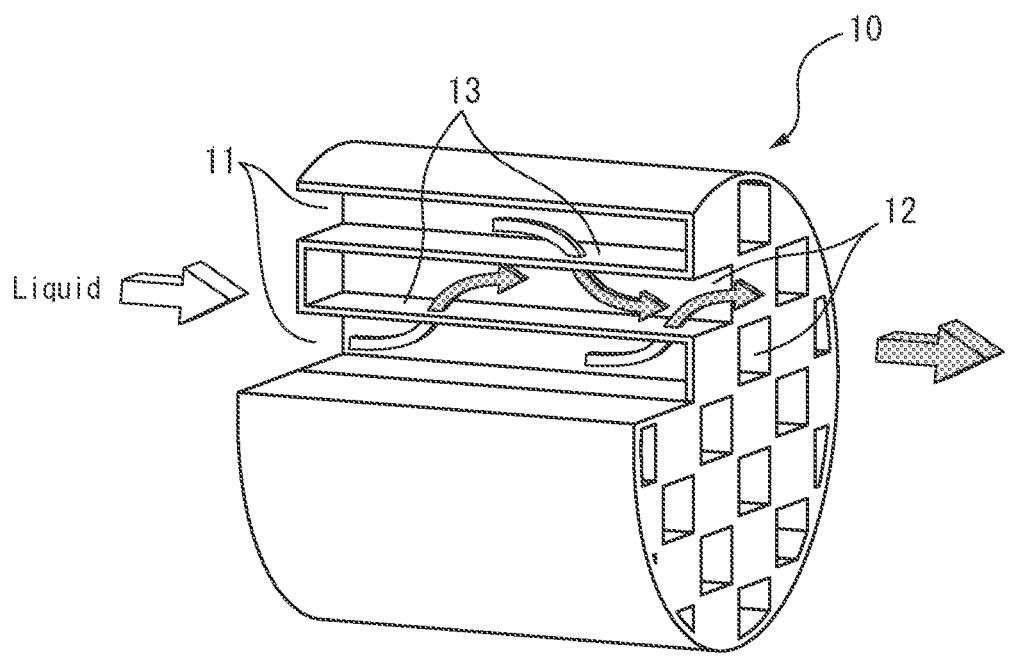
FIG. 2 is a schematic view of an embodiment of a porous body of the device of the present invention.

FIG. 2 is a schematic view of one embodiment of the porous body (10) used in the device of the present invention. The porous body (10) has a plurality of inlet flow paths (11) and a plurality of outlet flow paths (12), the inlet flow paths (11) and the outlet flow paths (12) are separated by porous walls (13), and the plurality of inlet flow paths (11) and the plurality of outlet flow paths (12) extend substantially in parallel to each other and are adjacent to each other. In this porous body (10) (porous filter substrate), a liquid flows from the inlet flow paths (11), and fine bubbles are generated when the liquid flows through the continuous pores of the porous wall (13). Thereafter, a liquid containing the fine bubbles flows out of the outlet flow paths (12). Note that FIG. 2 is a schematic diagram, due to constraints of the drawing, the porous body (10) is illustrated with a very small number of cells.

<Liquid Supply Part and Liquid Discharge Part>

The liquid supply part used in the device of the present invention is not particularly limited as long as it is capable of supplying a liquid to the continuous pores of the porous body. The liquid discharge part is not particularly limited as long it can discharge the liquid flowing through the continuous pores of the porous body.

Flow paths for which the liquid flows, a container for storing the liquid, a pump for pumping the liquid, a valve for controlling the flow rate of the liquid, and a controller for automated control of the pump and/or the valve may also optionally be present in the liquid supply part and the liquid discharge part. A person skilled in the art could suitably design the structures thereof in accordance with the application and the place of use of the fine bubble generation device.

<<Fine Bubble Generation Method>>

The fine bubble generation method of the present invention includes supplying a liquid to the porous body from the liquid supply part of a fine bubble generation device as described above, and causing the supplied liquid to flow through the continuous pores of the porous body to obtain a liquid containing fine bubbles from the liquid discharge part.

Regarding the features of the fine bubble generation method of the present invention, reference can be made to the features described with respect to the fine bubble generation device of the present invention.

The present invention will be further specifically described by way of the following Examples, but the present invention is not limited thereto.

EXAMPLES

The various commercially available porous filter substrates described in Table 1 were arranged on top of a beaker so that the longitudinal direction of the inlet flow paths thereof was vertical. Distilled water was dropped from the inlet flow paths to allow the distilled water to flow through the porous filter substrate by only gravity. The distilled water flowing through the porous filter substrate was discharged from the outlet flow paths and collected in the beaker. The number of fine bubbles generated (FB generation number) contained in the distilled water collected in the beaker was then measured using the nanoparticle analysis system NanoSight (Malvern Panalytical).

As a Comparative Example, a commercially available straight flow metal substrate which is used in the exhaust gas purification catalyst for a motorcycle was used to measure the number of fine bubbles generated in the same manner as described above.

Furthermore, the average flow diameter of each substrate was measured with a palm porometer. Specifically, measurement was carried out using a palm porometer manufactured by Porous Materials, Inc., under the condition of WetUP/DryUP (Galwick/air) by the bubble point method at a tortuosity factor of 0.715. Note that, regarding the average pore diameter and porosity, though the numerical values indicated by the distributors of the porous filter substrates were used, these values were measured by the above method.

The configuration and results of each example are shown in Table 1 below.

TABLE 1

|  | Ex 1 | Ex 2 | Ex 3 | Ex 4 | Comp Ex 1 |
| --- | --- | --- | --- | --- | --- |
| Material | Porous ceramic | Porous ceramic | Porous ceramic | Porous ceramic | Metal |
| Type | Wall flow | Wall flow | Wall flow | Wall flow | Straight flow |
| Cell number [/inch$^2$] | 260 | 260 | 220 | 300 | 400 |
| Wall thickness [µm] | 330 | 330 | 152 | 203 | 40 |

TABLE 1-continued

|  | Ex 1 | Ex 2 | Ex 3 | Ex 4 | Comp Ex 1 |
|---|---|---|---|---|---|
| Average flow diameter [μm] | 12.94 | 9.35 | 8.80 | 18.39 | 0 |
| Average pore diameter [μm] | 20 | 13 | 13 | 19 | 0 |
| Porosity [%] | 58 | 58 | 48 | 65 | 0 |
| FB generation number [$10^7$/mL] | 3.64 | 2.61 | 1.80 | 5.21 | 0.79 |

When the straight flow metal substrate of Comparative Example 1 was used, the number of fine bubbles generated was the number of the detection limit level of the nanoparticle analysis system used, and thus, fine bubbles were not generated. Conversely, in Examples 1 to 4, the number of fine bubbles generated was significantly increased.

Figure 3:
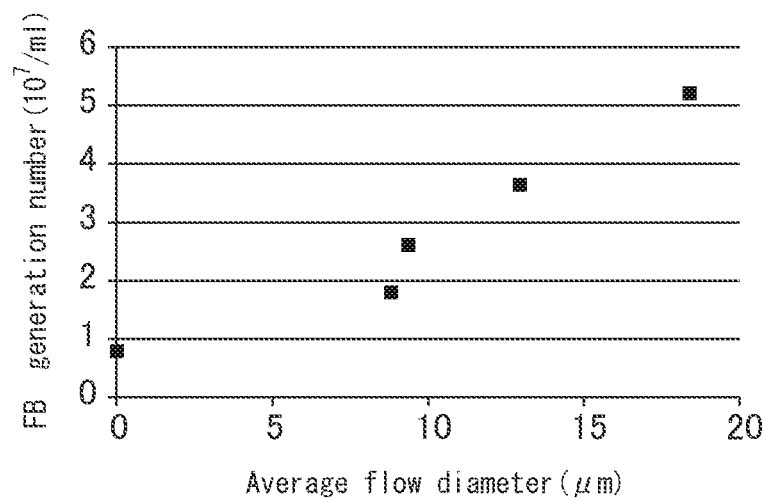
FIG. 3 is a plot showing the relationship between the average flow diameters of the substrates used in the Examples and the number of fine bubbles generated.

The relationship between the average flow diameters of Examples 1 to 4 and Comparative Example 1 and the number of fine bubbles generated is shown in FIG. 3. It could be understood that the average flow diameter corresponds to the average of the pore diameters of the smallest part of the communicating pores present in the porous body, and this average flow diameter has a high correlation with the number of fine bubbles generated.

Note that the particle diameters of the fine bubbles obtained in Examples 1 to 4 were approximately 100 to 400 nm, and were ultrafine bubbles.

REFERENCE SIGNS LIST 1 liquid supply part
2 liquid discharge part
10 porous body
11 inlet flow path
12 outlet flow path
13 porous wall
100 fine bubble generation device

The invention claimed is:

1. A fine bubble generation method using a fine bubble generation device comprising a porous body having continuous pores, a liquid supply part which supplies a liquid to the porous body and causes the liquid to flow through the continuous pores, and a liquid discharge part which discharges the liquid caused to flow through the continuous pores, wherein an average flow diameter of the porous body as measured with a palm porometer is 5 μm to 50 μm, and
the average flow diameter is an average of the pore diameters of a smallest part of the continuous pores in the porous body,
the method comprising the steps of:
supplying a liquid in which a gas is already dissolved to the porous body from the liquid supply part of the fine bubble generation device, and
causing the supplied liquid to flow through the continuous pores of the porous body to obtain a liquid containing fine bubbles from the liquid discharge part, wherein
the fine bubbles are derived from the gas during passage of the supplied liquid through the porous body, and
the fine bubbles emerge from the porous body with an average particle diameter of less than 1 μm.

2. The fine bubble generation method according to claim 1, wherein the porous body is made of ceramic.

3. The fine bubble generation method according to claim 1, wherein the porosity of the porous body is 40% to 80%.

4. The fine bubble generation method according to claim 2, wherein the porosity of the porous body is 40% to 80%.

5. The fine bubble generation method according to claim 1, wherein the porous body has a plurality of inlet flow paths and a plurality of outlet flow paths, and is a porous filter substrate in which the inlet flow paths and the outlet flow paths are separated by porous walls.

6. The fine bubble generation method according to claim 5, wherein the plurality of inlet flow paths and the plurality of outlet flow paths of the porous filter substrate extend substantially in parallel and are adjacent to each other.

7. The fine bubble generation method according to claim 5, wherein a thickness of the porous walls is 1.0 mm or less.

8. The fine bubble generation method according to claim 6, wherein a thickness of the porous walls is 1.0 mm or less.

* * * * *